United States Patent [19]

Dullinger

[11] 4,099,621
[45] Jul. 11, 1978

[54] CONVEYING AND REJECT APPARATUS FOR UPRIGHT STANDING BOTTLES

[75] Inventor: Karl Dullinger, Neutraubling, Fed. Rep. of Germany

[73] Assignee: Hermann Kronseder, Worth (Danube), Fed. Rep. of Germany

[21] Appl. No.: 786,532

[22] Filed: Apr. 11, 1977

[30] Foreign Application Priority Data

May 6, 1976 [DE] Fed. Rep. of Germany ....... 2619950

[51] Int. Cl.² ............................................ B07B 13/04
[52] U.S. Cl. .................................................... 209/98
[58] Field of Search ...................... 209/98, 99, 75, 90

[56] References Cited

U.S. PATENT DOCUMENTS

| 1,166,537 | 1/1916 | Neal | 209/99 |
| 2,329,873 | 9/1943 | Buzby | 209/90 |
| 2,369,557 | 2/1945 | Gettelman | 209/90 |

*Primary Examiner*—Allen N. Knowles
*Attorney, Agent, or Firm*—Joseph P. House, Jr.

[57] ABSTRACT

Conveying apparatus for upright standing bottles between two synchronously driven bottle treating machines. The apparatus comprises a star wheel and a worm, both being driven synchronously with the bottle treating machines. Supporting and guiding rails for the bottles are provided with gaps through which broken bottles and fragments thereof are discharged.

8 Claims, 4 Drawing Figures

U.S. Patent  July 11, 1978  4,099,621
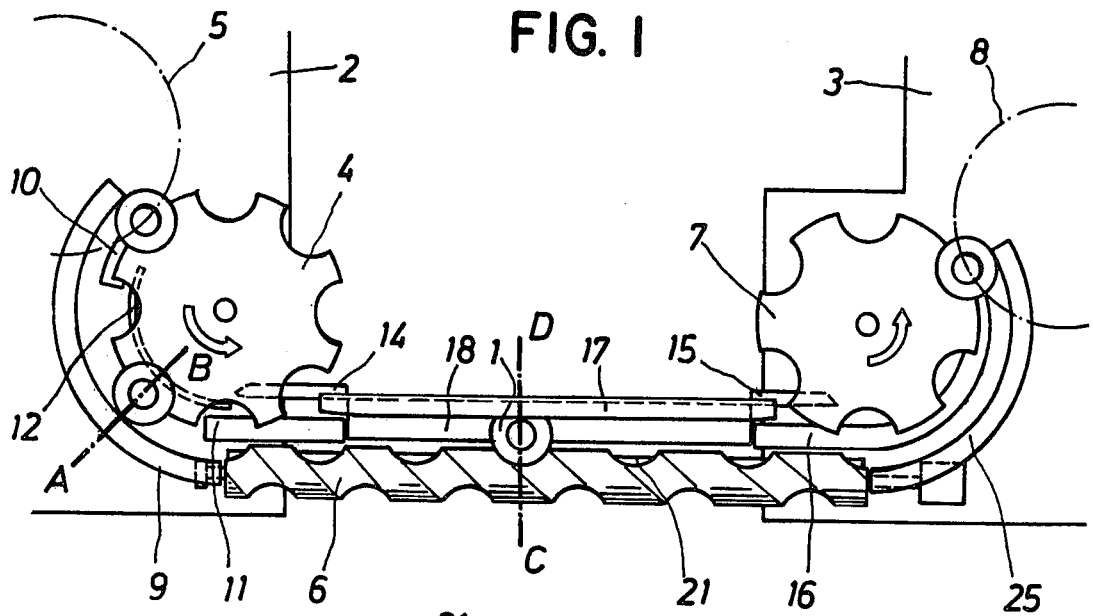
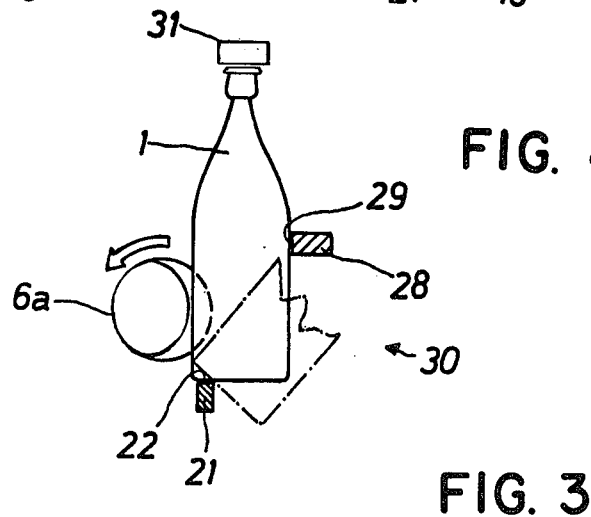
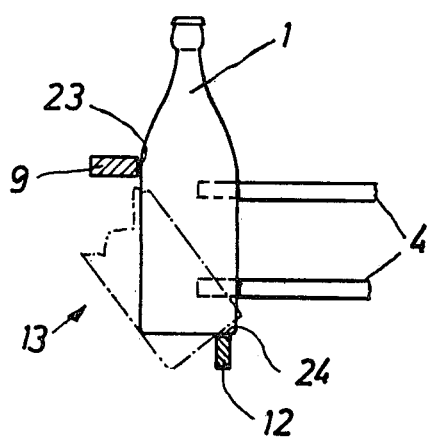
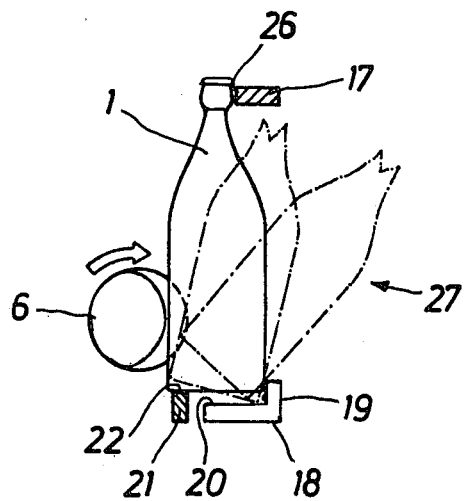

CONVEYING AND REJECT APPARATUS FOR UPRIGHT STANDING BOTTLES

BACKGROUND OF THE INVENTION

Bottle treating plants of the kind with which the bottles are transferred according to the pitch between synchronously driven single machines by means of positive conveyors offer a number of essential advantages in comparison with known plants in which such single machines are driven independently from each other and which are connected with each other by slat band conveyors or the like. Minimum floor space and staff requirements as well as reduced noise level and high reliability in operation are especially worth mentioning. In order to achieve these advantages, however, it is important that the working conveying apparatus between the single machines not malfunction because of the presence of broken bottles.

With a known apparatus of the above-mentioned kind the bottles are supported by supporting surfaces on their bottom and are guided by guiding surfaces at the sides of their bodies. Consequently, only small glass fragments of broken bottles can fall through between the guiding and supporting surfaces. Larger fragments and partially broken bottles are transported by the pockets of the star wheel and the worm to the following machine in the same way as normal bottles. These large fragments can cause heavy damage and disturbances to the machinery. For example, broken off bottle bottoms and the like can easily get in between the worm and supporting surface and can cause damage to the worm.

SUMMARY OF THE INVENTION

An object of the invention is to improve such apparatus with little expense in such a way that larger fragments and partially broken bottles are rejected automatically and that disturbances in the apparatus otherwise caused thereby are reliably avoided.

This object is solved according to the invention by providing two discharge or bottle rejecting sections along the bottle path. One section comprises a guide rail along the side of the bottle body and a support rail along the bottom of the bottle and a gap between said rails through which broken bottles and fragments thereof smaller than said gap will fall. The other section comprises a guide rail along the side of the bottle top and a support rail along the bottom of the bottle, and a gap between said rails through which broken bottles and fragments smaller than said gap will fall. Both gaps are longer than the bottle diameter. In preferred embodiments, the support rails are offset away from the side of the bottle engaged by the guide rail, thus to provide unbalanced support for the bottles.

In such apparatus, the first reject section primarily rejects broken off bottle bottoms and similar small fragments which often cause damage to the apparatus itself. After that process, the remaining, relatively high broken bottles and bottles from which only the tops are missing are rejected in the second reject section so that such broken bottle parts will not enter into the following machine. A specialization of different parts of the rejection apparatus to reject different kinds of broken bottle parts facilitates the design and adjustment of such sections for improved function in the best possible way without interfering with the transport of normal bottles. The additional expense of specialized reject sections is small compared with the known apparatus. Broken bottle parts are rejected by the specially constructed supporting and guiding surfaces and no additional parts are necessary. The propulsive forces of the star and worm and forces due to gravity are sufficient to reject the fragments through the gaps.

If the worm is long enough the two sections of the conveyor path with the gaps can be located in the worm area. In that event no rejection is done by the star wheel. However, it is more advantageous if according to a preferential construction of the invention the first reject section is part of the curved conveyor path in the area of the star wheel. In that construction broken bottles fall through the gap with the aid of centrifugal force. In the second reject section in the area of the worm, broken bottles fall through the gap with the aid of propulsive force of the worm. In such preferred construction both the star wheel and the worm contribute to rejection. It is especially advantageous that smaller cracks and fragments of broken bottles are rejected in the star wheel area so that such fragments will not get near to the worm and the worm is well protected against damage. In such construction, where the worm is in the second reject section, the worm desirably rotates with a thrust against the bottle to thrust the broken bottle and fragments over a trip lip on a bottle support.

According to one aspect of the invention, support rails in the area of the star wheel and the worm engage the bottle bottom eccentrically or offset laterally from the side of the bottle against a guide rail. Accordingly, broken bottles are moved through the gaps by the additional influence of gravity. Because of this fact fragments of all kinds are rejected reliably with low conveying speeds because there is an additional tilting action affecting the bottles.

According to another aspect of the invention a buffer for the bottle bottom is arranged on the second reject section at a level slightly lower and away from the worm than the supporting surface. Correct bottles are not affected by this buffer. Broken bottles, however, tilt into lopsided positon until their bottoms touch the buffer. Thus, broken bottles receive an initial acceleration and fall over the lower guiding surface under assistance of the worm and their own weight.

Another aspect of the invention resides in the fact that in one embodiment the smallest distance between the worm and lower guiding surface is less than the bottle diameter. Accordingly, the worm acts on the broken bottles until these are fully tilted over the lower guiding surface.

Other objects, features and advantages of the invention will appear from the disclosure hereof.

Cross reference is made to copending U.S. patent application Ser. No. 746,275 filed Dec. 1, 1976 and the prior art referred to therein.

DESCRIPTION OF THE DRAWINGS

FIG. 1 is a fragmentary and diagrammatic top view of apparatus embodying the present invention.

FIG. 2 is a fragmentary cross section along the line A–B of FIG. 1.

FIG. 3 is a fragmentary cross section along the line C–D of FIG. 1.

FIG. 4 is a fragmentary cross section similar to FIG. 3, but through a modified embodiment.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The apparatus according to FIGS 1-3 serves to convey upright standing bottles 1 between a filling and closing machine 2 and a labeling machine 3, both partly shown only. Both machines are driven synchronously and have different bottle pitches.

The apparatus is provided with a curved star wheel 4, taking the bottles from the bottle table 5 of the closing device and with a rectilinear worm 6 being located after the star wheel. Worm 6 advances the bottles to a further star wheel 7 which transfers the bottles to the infeed star 8 of the labeling machine 3. Star wheel 4, worm 6 and star wheel 7 are driven in the direction of the arrow synchronously with each other and to machines 2 and 3. The initial pitch of the worm 6 corresponds with the pitch of the star wheel 4. Its final pitch corresponds with the larger pitch of the star wheel 7. In between the pitch increases continuously.

A stationary guide bow or curved guide rail 9 with a vertically extending guiding surface 23 keeps the bottles 1 in the pockets of the star wheel 4. Rail 9 is mounted on the circumference of the star wheel 4 so that the bottles are forwarded on a curved conveyor path.

The guiding surface 23 of rail 9 contacts the bottles 1 on their upper body area just below the bottle shoulder as can be seen from FIG. 2. Stationary supporting rails or surfaces 10 and 11 are mounted in the infeed and discharge arms of the star wheel 4. Rails 10, 11 support the bottles 1 in the center of its bottom. A curved rail 12 with a supporting surface 24 is mounted between the ends of rails 10 and 11. Rail 12 supports the bottles 1 eccentrically or off-center in the area near the star wheel 4. This off-center support produces a tilting impulse or moment directed outward away from the star wheel as indicated in FIG. 2.

All fragments and broken bottles which are not tall enough to be restrained by rail 9 will fall and be rejected through a gap 13 between rail 12 and rail 9 by means of above-mentioned tilting impulse as well as by means of centrifugal force generated by the rotation of the star wheel 4. The length of the gap 13 is about the distance between adjacent ends of rails 10 and 11. In one embodiment this is three times the bottle diameter. Accordingly, there is enough room for broken bottles to fall through. As it can be seen from FIGS. 2 and 3, the guiding surface 23 of rail 9 is located higher than the level of the top of the worm. Accordingly, fragments which could jam between the worm 6 and the rails are rejected through the gap 13 in a reliable way.

The stationary supporting rail 11, beginning at the discharge of the star wheel 4, extends to the infeed of the worm 6. A stationary rail 14 contacting the bottles at the middle part of their body is arranged near the stationary rail 11, thus transferring the bottles out of the pockets of the star wheel 4 into the worm 6. There is no rejection of fragments in this transferring zone between star wheel 4 and worm 6.

Another stationary rail 15 with a guiding surface engaging the bottles on the center of their body and aligned with rail 14 is mounted on the transferring zone between worm 6 and star wheel 7. Rail 15 cooperates with a supporting surface 16, beginning at the discharge end of worm 6 and supports the bottles in their center until reaching the star wheel 7. Guide bow or curved rail 25 which engage the bottles at the upper and lower part of the body are mounted on the circumference of the star wheel 7. Said guide bows 25 hold the bottles in the pockets of the star wheel 7.

A stationary upwardly elevated guide rail 17 with a vertically extending guiding surface 26 contacts the bottle at the side of its crown (FIG. 3) and is mounted between the ends of the two rails 14 and 15. Below this guide rail 17 there is another stationary rail 18 having an angular profile. A vertical guiding surface or trip lip 19 contacts the sides of the bottles near their bottoms. The horizontal leg of rail 18 constitutes a buffer 20 for the bottoms of broken bottles and is disposed at a level a little lower than the normal conveying path, as it is defined by supporting surfaces 10, 24, 11 and 16. Finally there is a support rail 21 with a supporting surface 22, which is located at the level of the normal conveying path of the supporting surfaces 11 and 16. Rail 21 is offset eccentrically of the bottle bottom toward the worm 6, so that a tilting impulse affects the bottles in the worm which tries to eject them away from the worm.

Correct bottles are guided exactly and kept in the pockets of the worm by means of guiding surfaces 26 and 19 being situated on that side of the conveyor path of the bottles 1 which is opposite to the worm 6 whereby the bottles stand on the supporting surface 22. Bottles without tops or crowns, however, are not engaged by the upper guiding surface 26 of rail 17 and tilt over the support surface 22 with aid of their own weight till they reach the buffer 20. Broken bottles are then moved further outward by the outward directed component or thrust of the propulsive worm force until their center of mass is outside the trip lip 19. The bottles then tilt or trip over the lip 19 through the gap 27 between the two guiding surfaces 26 and 19 with the assistance of gravity and are rejected completely out of the line of correct bottles. In the illustrated embodiment, the gap 27 is six times longer than a bottle diameter so that there is enough space and time for broken bottles to fall through.

As it can be seen from FIG. 3, the shortest distance between the outer periphery of worm 6 and the lowest guiding surface 19 is sightly smaller than the bottle diameter. Accordingly, tilting broken bottles are under the influence of the propulsive force of the worm for a relatively long time and consequently there is a reliable rejection.

The buffer 20 enables an exact predetermined, step-by-step tilting of broken bottles.

In operation, correct bottles are transferred continuously and according to the pitch between the two treating machines 2 and 3 in the apparatus according to FIGS. 1-3 while broken bottles and fragments, disregarding the size, are rejected through the gaps 13 and 27. This prevents their entrance into the labeling machine 3. The worm 6 engages only relatively high fragments of broken bottles and is not subject to the cutting action of sharp edged fragments. Worm 6 can therefore be manufactured out of a suitable synthetic material to ensure quiet and smooth operation, without being damaged.

It is also possible to do the complete rejection in the area of the worm if the worm 6 is long enough, or if there are disadvantageous circumstances with respect to rejection in the area of the star wheel 4. In such a case the rail 12 near the star wheel 4 is omitted and the supporting surfaces 10 and 11 join each other. Inasmuch as guide rail 9 is arranged on the level of the middle body area of the bottle, it is not possible that broken bottles less tall than rail 9 are rejected in the zone of the star wheel 4. The rail 18 is omitted along the first part of the straight conveyor path of the bottles in the area of the worm 6, as illustrated in FIG. 4. Instead, another rail 28 with a guiding surface 29 is mounted at a level to contact the bottle on the upper body area. Smaller fragments and broken bottles shorter than the level of rail 28 will therefore fall through the gap 30 which is constructed between supporting surface 22 and guiding surface 29 with aid of their own weight and the propulsive force of the worm. High fragments of broken bottles are rejected on the second part of the conveyor path, as illustrated in FIGS. 1 and 3.

In order to reduce the possibility of damage of the worm 6 the rotation of the worm can be chosen in such a way that it rotates upwards on that side adjacent to the bottles, as shown in FIG. 4. In this case it is useful to install holddown rail 31 for holding down of the bottles in order to keep the bottles in their place.

What is claimed is:

1. In apparatus for conveying upright standing bottles on a path between two synchronously driven bottle treating machines, said apparatus comprising a pocketed star wheel and a worm both driven synchronously with the bottle treating machines, and rails along said path for supporting and guiding said bottles along said path, the improvement for rejecting fractured bottles in which there are two bottle rejecting sections along said path, one of said sections comprising a guide rail along the side of the bottle body and a support rail along the bottom of the bottle and a first gap between said rails through which broken bottles and fragments thereof smaller than said first gap will fall, the other said section comprising a guide rail along the side of the bottle top and a support rail along the bottom of the bottle and a second gap between said rails through which broken bottles and fragments larger than the first gap but smaller than said second gap will fall, both said gaps being longer than the bottle diameter.

2. Apparatus according to claim 1 in which the first section of the conveyor path is part of a curved path around the star wheel, whereby broken bottles falling through the gap of said first section are subject to centrifugal force, and in which the second section of the conveyor path is part of a straight path along the worm, whereby broken bottles falling through the gap are subject to the propulsive force of the worm.

3. Apparatus according to claim 2 in which the support rail in said first section is offset toward the other side of the bottle whereby broken bottles falling through the gap have an unbalanced support to promote gravity discharge of the bottle.

4. Apparatus according to claim 1 in which the guide rail in said first section contacts the bottle on its body above the level where the bottle is engaged by the worm.

5. Apparatus according to claim 1 in which said second section is further provided with a buffer for the bottle bottom disposed at a level lower than the support rail, and offset away from the worm.

6. Apparatus according to claim 5 in which the buffer has a trip lip at its edge remote from the worm.

7. Apparatus according to claim 6 in which the spacing between the worm and the trip lip is less than the bottle diameter.

8. Apparatus according to claim 1 in which both the first and second reject sections are part of a straight path along said worm.

* * * * *